United States Patent [19]

Erben et al.

[11] Patent Number: 4,551,328

[45] Date of Patent: Nov. 5, 1985

[54] SELECTIVELY ABSORBENT LAYER FOR SOLAR COLLECTORS, AND METHOD OF MAKING IT

[75] Inventors: Edwin Erben, Munich; August Mühlratzer, Gilching; Roland Bertinger, Munich; Boy Cornils, Dinslaken; Bela Tihanyi, Oberhausen; Werner DeWin, Dinslaken, all of Fed. Rep. of Germany

[73] Assignee: M.A.N. Maschinenfabrik Augsburg-Nurnberg Aktiengesellschaft, Munich, Fed. Rep. of Germany

[21] Appl. No.: 496,383

[22] Filed: May 20, 1983

[30] Foreign Application Priority Data

May 27, 1982 [DE] Fed. Rep. of Germany ....... 3219996
Mar. 12, 1983 [DE] Fed. Rep. of Germany ....... 3308790

[51] Int. Cl.$^4$ .............................................. C23B 5/00
[52] U.S. Cl. ...................................... 423/607; 423/55
[58] Field of Search .................................. 423/607, 55

[56] References Cited

U.S. PATENT DOCUMENTS 3,896,209  7/1975  Fournier et al. ................... 423/607
4,367,213  1/1983  Fiorucci et al. ................... 423/607

FOREIGN PATENT DOCUMENTS 50-25495  3/1975  Japan ................................. 423/607
218495    1/1968  Sweden .............................. 423/607

Primary Examiner—Veronica O'Keefe
Attorney, Agent, or Firm—Alan H. Levine

[57] ABSTRACT

A selectively absorbent layer for solar collectors, comprising a mixture of chromium oxides resulting from thermal decomposition of chromium hexacarbonyl or substituted chromium carbonyl. The absorbent layer is deposited from a process gas containing the carbonyl gaseous phase, oxygen, and inert carrier gas. An intermediate reflective layer is provided between the absorbent layer and the substrate.

7 Claims, No Drawings

SELECTIVELY ABSORBENT LAYER FOR SOLAR COLLECTORS, AND METHOD OF MAKING IT

This invention relates to a selectively absorbent layer for solar collectors, and to a method of making it.

For good efficiency, a solar collector should have a selectively absorbent surface, i.e., a surface of maximum absorbancy $\alpha$ in the solar radiation range and minimum emissivity $\epsilon$ in the longer-wave range of electromagnetic radiation. In the solar collector field, therefore, the provision of absorbent surface layers of good selectivity is of special significance. Selectivity is generally achieved by combining a thin absorbent layer for the $\alpha$ effect with an emission layer arranged thereunder.

State-of-the-art selectively absorbent surface layers provide satisfactory selectivity in a low-temperature range, but cease to have a satisfactory effect at temperatures above 300° to 350° C.

In a broad aspect, the present invention provides, therefore, an absorbent layer for solar collectors having thermal stability and good selectivity at low temperatures as well as at temperatures above approximately 350° C.

It has been discovered that, surprisingly, in the course of thermal decomposition of chromium hexacarbonyl, deposition produces a layer having an absorbent effect, and that the absorption effect can substantially be raised if the thermal decomposition of $Cr(CO)_6$ takes place in the presence of oxygen. The oxygen operates to partially oxidate the chromium during or immediately after nucleation and condensation. What then results is a layer consisting of or containing a mixture of chromium oxides of uncertain composition. This differs greatly from the glossy metallic layers which are deposited during the thermal decomposition of the carbonyl compounds of other metals.

It is, therefore, a particular object of the present invention to provide a selectively absorbent layer for solar collectors, characterized by the absorbent layer consisting or containing a mixture of chromium oxides formed by the thermal decomposition of chromium hexacarbonyl.

In the manufacture of solar selective layers by deposition from the gaseous phase, where the extremely thin layers produced are a few tenths of a micrometer thick, an important part is played not only by the substance to be separated but also by the vaporability of the compounds concerned. An advantage is generally afforded by compounds which develop a considerable vapor pressure at low temperatures and the vaporization and decomposition temperatures of which are sufficiently spaced apart to prevent thermal decomposition from occurring too rapidly and completely within a very narrow temperature range. This can be achieved, in the thermal decomposition of $Cr(CO)_6$, by exactly determining the most favorable deposition conditions and by maintaining these during the coating process.

In a further aspect of the present invention, a controlled decomposition rate is achieved by substitution of simple carbonyls. This affords improved control over the deposition process for the production of reproducible, extremly thin absorbent layers in the 0.3 $\mu$m range.

As substituents, use is preferably made of aromatic or aliphatic amines, phosphines, phosphites, or oxygen and nitrogen heterocycles. Preferred substituted carbonyls would be chromium pentacarbonyl trimethylamine, chromium pentacarbonyl pyridine, chromium pentacarbonyl pyrrolidine, and trimethylphosphite chromium pentacarbonyl.

The absorbent layer of the present invention is advantageously separated from the gaseous phase by a pyrolitic process using an inert carrier gas. As an inert carrier gas, use is preferably made of argon, helium, or a mixture of the two gases.

The temperature of pyrolysis is between about 150° C. and 450° C., and preferably about 300° to 450° C. The concentration of carbonyl is preferably about 0.05 to 5% by volume, while the oxygen admitted to the gaseous phase runs in the range of 0.01 to 0.6% by volume. Pyrolysis preferably takes place at ambient pressure. The work can optionally proceed also at a positive or negative pressure.

The thickness of absorbent layer to be deposited normally runs in the 0.2 to 0.6 $\mu$m range, a layer of this thickness being deposited within 15 minutes to 1 hour at ambient pressure, depending on the chromium carbonyl concentration and the temperature used.

In practical application of the absorbent layer of the present invention for manufacturing solar collectors, use is normally made of the common substrate materials for such collectors, such as steel, copper, titanium, ceramics, etc., which come in the shape of plate, sheet, foil, tube or other suitable geometric configurations. On to the collector substrate, an intermediate layer of one of the commonly used metals of low emissivity, called an intermediate reflector layer, of perhaps nickel, rhodium, ruthenium, platinum, molybdenum, or tungsten is deposited. Thereafter, the absorbent layer of the present invention is deposited on to the intermediate layer by the pyrolysis of chromium hexacarbonyl in the presence of oxygen.

In a preferred procedure, chemical vapor deposition (cf. "Metall" journal, volume 12, 1981, p. 1253 et seq; Metall-Verlag GmbH, Berlin) is used in a single apparatus to first deposit from the gaseous phase onto the substrate an intermediate layer of molybdenum or tungsten by the chemical decomposition of suitable compounds of these metals (e.g. carbonyl). Thereafter, the absorbent layer of the present invention is deposited onto the intermediate layer using the same techniques.

Using the method just described, it will be possible to produce layers of high absorbency and of sufficient thinness to form together with one of the normal intermediate reflector layers, so-called solar selective coatings achieving an absorbency $\alpha$ to about 0.96 and an IR emissivity $\epsilon$ to about 0.2. The layers are additionally characterized, given a suitable intermediate reflector layer, by high thermal resistance at temperatures above 350° C.

The embodiments described below will illustrate the absorbent layer of the present invention together with its manufacture and properties:

EXAMPLE 1

A nickel intermediate layer about 5 $\mu$m thick was electro-deposited on one side of a stainless steel panel having a surface area of 9 cm square, after which an absorbent coating was separated onto the intermediate layer by a chemical vapor deposition technique. For the purpose, the sample was heated to 350° C. in an argon atmosphere. After the temperature had stabilized, process gas was routed across the surface of the sample, this gas containing argon plus 0.7% by volume $Cr(CO)_6$ in the form of vapor and 0.2% by volume oxygen. After 30 minutes, the flow of process gas was interrupted and the coated sample was cooled to room temperature in an atmosphere of argon. The resulting absorbent layer was 0.6 μm thick. The readings were 0.95 for $\alpha$ and 0.23 for $\epsilon$.

EXAMPLE 2

On a stainless steel panel having a surface area of 9 cm square on one of its faces, a nickel layer about 5 μm thick and, thereon, an Rh layer about 1 μm, were deposited. The absorbent layer was deposited by chemical vapor deposition as described for Example 1. The resultant layer was 0.5 μm thick. The readings were 0.94 for $\alpha$ and 0.17 for $\epsilon$.

EXAMPLE 3

A stainless pipe section 4 cm in a diameter and 20 cm long was coated with an absorbent layer which was deposited by a chemical vapor deposition technique onto the approximately 250 cm square surface area in the absence of any electrodeposited intermediate layer. The sample was heated to 400° C. in an argon atmosphere. Process gas was then routed across the surface of the sample, the gas containing argon plus 1.0% by volume $Cr(CO)_6$ in the form of vapor and 0.4% by volume oxygen. After a deposition time of 60 minutes the flow of process gas was interrupted and the sample was cooled to room temperature in an argon atmosphere. The absorbent layer was 0.5 μm thick. The readings were 0.96 for $\alpha$ and 0.25 for $\epsilon$.

EXAMPLE 4

(a) Using $Cr(CO)_6$ as a starting material, a $Cr(CO)_5$ THF complex was produced as an initial product. For the purpose, 5.5 g $Cr(CO)_6=25$ m mol were dissolved in 500 ml tetrahydrofuran. The action of ultraviolet light on the mixture caused the separation of 25 m mol CO after 20 minutes at about 20° C., whereby an intensely yellow complex, dissolved in tetrahydrofuran, was formed.

(b) The initial product obtained in accordance with (a) above was then treated for the generation of chromium pentacarbonyl trimethylamine as follows:

To the initial product, 10.5 g of an aqueous trimethylamine solution was added in the amount of 40% by weight. After a reaction time of 5 minutes, the solvent, including the excess trimethylamine, was evaporated in a rotary evaporator at 40° C. Upon recrystallization in hexane, the compound was present in the form of yellow crystals. A total of 1.42 g of the compound was produced, which was equivalent to a yield of 23% of the theoretical value referred to the chromium hexacarbonyl prepared.

(c) The substituted carbonyl obtained in this manner was used in the deposition process at the conditions set forth in Example 1.

EXAMPLE 5

Using the initial product produced in accordance with Example 4(a), chromium pentacarbonyl pyridine was produced as follows:

To the initial product, 6 g of pyridine was added. After a reaction time of 10 minutes, the residue formed was separated by filtration. The yellow-colored filtrate was concentrated by destillation and the remaining solvent was removed by subsequent vacuum distillation. What remained was 1.62 g yellow-greenish crystals equivalent to a yield of about 24% of the theoretical value referred to the chromium hexacarbonyl prepared.

Chemical vapor deposition is then achieved as described in Example 1.

EXAMPLE 6

Manufacture of chromium pentacarbonyl pyrrolidine

To an initial product as described in Example 4(a), 5.4 g of pyrrolidine are added. During a reaction time of 20 minutes the originally intensely yellow solution turned green. The solvent and the excess pyrrolidine were removed by distillation in a vacuum at 40° C. and 20 mm Hg. What remained was 1.59 g of the compound as yellow-greenish solid matter equivalent to an approximate yield of 25% of the theoretical value referred to the chromium hexacarbonyl used.

EXAMPLE 7

Manufacture of trimethyl phosphite chromium pentacarbonyl

A mixture consisting of 5.5 g $Cr(CO)_6=24$ m mol, 3.1 g trimethylphosphite and 50 ml diethylene glycolidimethylether was reacted at 145° to 150° C. for a duration of 3 hours. The clear, green solution was subjected to distillation in a vacuum to remove the solvent and the excess trimethylphosphite. At 130° C. and 20 mm Hg there remained 4.7 g of the compound in the form of a green gel. This quantity is the equivalent of an approximately 60% theoretical yield referred to the chromium hexacarbonyl used.

Using the substituted carbonyls gained in accordance with Examples 6 and 7, deposition processes were used in accordance with Example 1. The resultant layers were homogeneous and 0.2 to 0.3 μm thick.

This invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A selectively absorbent layer for solar collectors, consisting essentially of a mixture of chromium oxides formed by the thermal decomposition of chromium hexacarbonyl, or substituted chromium pentacarbonyl from a process gas containing chromium hexacarbonyl, in an inert gas, and oxygen, the process gas including about 0.05 to about 5% chromium hexacarbonyl, by volume, and about 0.01 to about 0.6% oxygen, by volume.

2. A method of making a selectively absorbent layer for solar collectors, comprising the steps of providing a substrate, providing a process gas containing chromium hexacarbonyl, or substituted chromium pentacarbonyl an inert gas, and oxygen, depositing a mixture of chromium oxides on the substrate by thermal decomposition of the chromium hexacarbonyl, the process gas including about 0.05 to about 5% chromium hexacarbonyl, by volume, and about 0.01 to about 0.6% oxygen, by volume.

3. A method as defined in claim 2 wherein the chromium hexacarbonyl is substituted, the substituent being selected from the group consisting of aromatic amines, aliphatic amines, phosphines, phosphites, oxygen heterocycles, and nitrogen heterocycles.

4. A method as defined in claim 3 wherein the substituted chromium hexacarbonyl is selected from the group consisting of chromium pentacarbonyl trimethylamine, chromium pentacarbonyl pyridine, chromium pentacarbonyl pyrrolidine, and trimethylphosphite chromium pentacarbonyl.

5. A method as defined in claim 2 wherein the thermal decomposition takes place at a temperature between about 150° C. to 450° C.

6. A method as defined in claim 2 wherein the thermal decomposition takes place at a temperature between about 300° C. and 450° C.

7. A method as defined in claim 2 wherein the inert carrier gas is selected from the group consisting of argon, helium, and a mixture of argon and helium.

* * * * *